United States Patent Office 3,630,952
Patented Dec. 28, 1971

3,630,952
METAL-PHOSPHO-SILICA COMPOSITION AND METHOD OF MANUFACTURE
Claudius Nielsen, 18464 Harlow Ave.,
Detroit, Mich. 48235
No Drawing. Continuation-in-part of applications Ser. No. 355,936, Mar. 30, 1964, Ser. No. 372,385, June 3, 1964, and Ser. No. 404,901, Oct. 19, 1964. This application July 14, 1969, Ser. No. 841,564
Int. Cl. B01j *13/00;* C09d *5/08;* C23f *11/18*
U.S. Cl. 252—309                                     38 Claims

ABSTRACT OF THE DISCLOSURE

A metal-phospho-silica composition useful as a component of paints, lacquers, adhesives, sealing agents, caulking agents and the like, to impart anti-corrosion, impermeability and intumescence to such compositions, in which a divalent or trivalent metal, metal oxide or metal salt is reacted with orthophosphoric acid in a ratio sufficient to form a metal hydrogen phosphate solution containing metal dihydrogen phosphate in a major proportion and free orthophosphoric acid in a minor proportion; and thereafter, reacting a major proportion of the metal hydrogen phosphate solution with a minor proportion of an alkali metal silicate in a ratio sufficient to form a soft, non-crystalline metal-phospho-silica composition. The metal-phospho-silica composition is substantially insoluble in water and in most organic solvents, but it is readily dispersed therein; and may be dispersed in such materials by the addition of a suitable surface active agent. The metal-phospho-silica composition may also be produced in powdered form by utilizing any one of several techniques for removing water from the reaction product.

CROSS-REFERENCES TO RELATED APPLICATIONS

The present application is a continuation-in-part of application Ser. No. 355,936, now abandoned, filed Mar. 30, 1964; Ser. No. 372,385, now abandoned, filed June 3, 1964; and Ser. No. 404,901, now abandoned, filed Oct. 19, 1964, all by the present inventor and all entitled "Phospho-Silica-Gel Compositions."

BACKGROUND OF THE INVENTION

Field of the invention

The present invention relates to metal-phospho-silica compositions and a method of preparing the same. In a more specific aspect, the present invention relates to divalent or trivalent metal-phospho-silica compositions and a method of preparing the same.

Description of the prior art

In the production of coatings, paints, binders, adhesives, sealers, grouting, caulking, mastic compositions and the like, it is highly desirable that additives be incorporated therein which will provide one or more of the following properties to the composition: extend the useful life of the material, render the material resistant to corrosion, remain stable in the composition, impart moisture-resistance to the composition, impart impermeability to air and/or moisture, improve the adhesion of the composition to a substrate or object to which it is applied and improve other like properties thereof.

In one phase of the prior art related hereto, it has heretofore been known that silica gels can be produced by reacting a liquid alkali metal silicate with a mineral acid, as disclosed in U.S. Pats. No. 1,297,724; No. 2,093,454; No. 2,188,807; No. 2,249,767 and No. 2,594,725. However, such gels are hard, brittle, watery and most are completely soluble in water. As a result, it has been found that they have no value as additives for organic compounds since they will not impart moisture resistance and like properties thereto. It has also been known, as illustrated by U.S. Pat. No. 2,594,724, that silica-type gels can be produced by reacting a liquid alkali metal silicate with alkali metal phosphates and alkali metal hydrogen phosphates. However, these materials have also been found to be soluble in water and therefore unsuited for imparting moisture resistance and the like to organic compounds. Further, the gel formed in this manner has also been found to be a crystalline-type gel and therefore not readily dispersible in and unstable for use in organic compounds.

The other phase of the prior art, relating to the present invention, is the known fact that acid metal phosphate solutions and dihydrogen phosphate solutions, produced by reacting a metal in the form of shavings or a powder with phosphoric acid, are capable of imparting a stronger bond to paint when it is applied over a phosphated surface and also of imparting a certain degree of corrosion-resistance to such coated substrate or object. Illustrative patents in this area are No. 1,651,694; No. 1,666,661; No. 1,926,265; No. 2,395,800. The value of these materials as bonding and anticorrosion additives is believed to stem from the presence of phosphoric acid in the solution which tends to react with the metal surface to establish a strong bond between the paint film and the metal and, at the same time, to neutralize oxides present and prevent further formation of oxides thereby improving the useful life of the coating and the resistance of the metal to further corrosion.

Based on the above, efforts have been made to incorporate as much as 20% phosphoric acid into paint vehicles. However, in order for the composition to remain stable, it was necessary to employ special paint vehicles. To improve upon this approach, applicant formed a series of acid-metal complexes which, when added to the paint vehicle, imparted the sought-after improvements thereto. However, it was found that too many different formulations were necessary for different paints, the product had poor stability in some vehicles, the complex was difficult to incorporate in a paint composition and the composition lacked the ability to impart moisture resistance to the coated substrate or article. It is therefore an object of the present invention to provide a metal-phospho-silica composition and a method of preparing the same which are useful for all of the above mentioned and other purposes and which overcome the previously mentioned problems of the prior art.

SUMMARY OF THE INVENTION

A metal-phospho-silica composition and method of preparing the same, comprising reacting a compound selected from the group consisting of divalent and trivalent metals, metal oxides, metal salts and mixtures thereof, with orthophosphoric acid in a ratio sufficient to produce a metal hydrogen phosphate solution containing a major proportion of metal dihydrogen phosphate and a minor proportion of free orthophosphoric acid, and thereafter reacting the metal hydrogen phosphate solution with an alkali metal silicate in a ratio sufficient to produce a non-crystalline, gel-type precipitate. The compatibility of the gel with organic solvents may be improved in some instances by adding an alkaline material to the metal hydrogen phosphate solution to increase the pH of the composition. The gel composition may also be dispersed in organic solvents by the addition thereto of an effective amount of a surface active agent or emulsifying agent, or it may be produced in a powder form by applying a technique for removing water from the gel composition. By utilizing mixtures of the metals and metal compounds in amounts such that the product of the molecular weight and the weight in grams of the metal component used does not exceed 160 for all metal components per 4 mols of phosphoric acid, a gel product having improved compatibility with a larger variety of solvents and organic materials can be produced.

DESCRIPTION OF THE PREFERRED EMBODIMENTS

As previously indicated, certain divalent and trivalent metals; metal oxides and the metal salts react with orthophosphoric acid to produce metal hydrogen phosphate solutions generally containing a major proportion of metal dihydrogen phosphate and a minor proportion of free orthophosphoric acid. In certain instances, minor proportions of metal monohydrogen phosphate are also present. Typical materials which have been utilized for this purpose are iron, manganese and zinc. The reaction of zinc oxide with orthophosphoric acid illustrates the nature of this type recation.

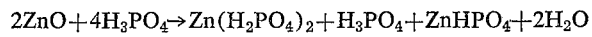

$$2ZnO + 4H_3PO_4 \rightarrow Zn(H_2PO_4)_2 + H_3PO_4 + ZnHPO_4 + 2H_2O$$

In accordance with the present invention, it has been found that divalent and trivalent metals, metal oxides metal salts and mixtures of these, particularly mixtures of oxides with salts, in which the major proportion of the metal component is insoluble in water, can be utilized as the metal component in the preparation of metal hydrogen phosphate solutions for use herein. Appropriate salts include acetates, carbonates, fluorides, nitrates, oxalates, fluorsilicates, and the like, which are substantially insoluble in water. Some of the materials useful herein are slightly soluble in water, but the vast majority are completely insoluble in water. Hence, when the term "substantially insoluble in water" is used herein, it is meant to include both materials which are completely insoluble in water and those which are slightly soluble in water. It has further been found in this respect that, when materials, such as iron carbonate magnesium carbonate, zinc carbonate, and zinc oxide, which are completely insoluble in water, are utilized, these materials may be used alone. However, their usefulness is limited by their compatibility characteristics and the fact that they can be used most effectively only in paints for ferrous metals. On the other hand, if mixtures of oxides, metals and metal salts are utilized, some of the materials may be water-soluble without detrimentally effecting the composition so long as the major portion of the metal component mixture is substantially insoluble in water. Further, if the major portion of the metal component mixture is substantially insoluble in water, small amounts of metal, metal oxides, or metals salts of monovalent metals may be utilized.

Specific oxides which have been found useful in accordance with the present invention include aluminum oxide (hydrate), antimony trioxide, arsenous trioxide, barium oxide beryllium oxide, boron oxide, cadmium oxide, cobaltus oxide, chromic oxide, ferrous oxide, lead oxide, magnesium oxide, tin oxide, titanium oxide, and zinc oxide. Specific salts include aluminum acetate, aluminum-sodium fluoride, barium carbonate, barium nitrate, barium oxalate, barium fluosilicate, cadmium carbonate, cadmium oxalate, calcium carbonate, calcium fluoride calcium nitrate, calcium oxalate, cobaltus carbonate, cobaltus oxalate, ferrous carbonate, ferrous fluoride, ferrous oxalate, lead carbonate, lead acetate, lead fluoride, lead nitrate, lithium carbonate, lithium nitrate, lithium oxalate, magnesium carbonate magnesium fluoride, magnesium nitrate, magnesium oxalate, magnesium fluorosilicate, manganese carbonate, manganese fluoride, manganese oxalate, titanium-potassium acetate, zinc acetate, zinc carbonate, zinc fluoride, zinc nitrate, zinc oxalate and the like. Of the above, the lithium salts, barium nitrate, calcium nitrate, lead nitrate magnesium nitrate, manganese nitrate, zinc acetate, and zinc nitrate are essentially water-soluble and should not be used except as a minor component of a metal component mixture along with a major proportion of substantially, water-insoluble compounds.

In producting the hydrogen phosphate solution in accordance with the present invention, the metal, metal oxide or metal salt is dispersed in water and is then contacted with the orthophospheric acid. It has been discovered in accordance with the present invention that in order to produce stable metal-phosphosilica compositions, with the widest range of possible application capable of imparting desirable properties to organic compounds in use, it is necessary to produce a product having as little free water as possible. Hence, in some instances, the amount of water should be no greater than the amount necessary to form a paste of the metal, metal oxide or metal salt. In no event, however, should the amount of water be greater in weight than the weight of the phosphoric acid utilized. The phosphoric acid, as previously indicated, is orthophosphoric acid and may be utilized in concentrations of 50 to 80% or any suitable standard concentration. As previously indicated, the relative amounts of metal, metal oxide or metal salt and phosphoric acid should be at least an amount sufficient to form the metal dihydrogen phosphate. Generally, the first hydrogen is most easily replaced to form the metal dihydrogen phosphate, then the second hydrogen to form the metal monohydrogen phosphate and, finally, all three hydrogens to form the metal phosphate. In the preferred embodiment, it is desired that less than stoichiometric amounts of the metal component be used. However, it appears that the molecular weight of the metal components have a distinct bearing on the final product. Thus, it has been found that the metal components should be used in amounts such that the product of the molecular weight and the weight in grams of the metal component should not excede 160 per 4 mols of phosphoric acid. Ratios below this indicated maximum are particularly effective where mixtures of metal components are employed. It is also preferred, primarily because of difficulties of reacting the metal, that the metal be in the form of its oxide or salt rather than in a free metal state.

The hydrogen phosphate solution produced in the manner set forth above should not geenrally contain more than about 15% of free phosphoric acid and as indicated, should be a mixture of a major proportion of a metal dihydrogen phosphate and a minor proportion of free phosphoric acid. While it is not intended that this invention be limited to any particular theory of operation, it is believed that the effectiveness of the compositions of the present invention are dependent upon the use of metal components which are substanitally insoluble in water and thereby capable of producing metal-phospho-silica compositions which are substantially insoluble in water and in most organic solvents. However, in spite of the insolubility of the end product, such end product is a soft, non-crystalline, gel-type precipitate which can be readily dispersed in a wide variety of solvents and in emulsions by known means. It is also believed that the lack of any crystalline structure in the metal-phosphosilica compositions of the present invention is responsible for the ease of dispersion and the stability of the resultant compositions when the metal-phospho-silica composition of the present invention is utilized as an additive in organic compositions and emulsions. However, as indicated, a wide variety of metal components can be utilized, including salts of metals other than divalent and trivalent metals and water-soluble compounds, so long as the major component of a mixture is substantially water-insoluble and is a divalent or trivalent metal, metal oxide or metal salt.

It has been discovered in accordance with the present invention that by employing mixtures of certain types of metals, metal oxides, and metal salts, the compatibility of the metal-phospho-silica composition with certain types of liquid resins, resin solutions, and latices can be improved.

In addition to the type of metal component employed, it has also been found that by adding a base, such as an alkali metal or ammonium hydroxide, to the water in which the metal component is dispersed, metals, metal oxides and metal salts which are not readily reactive with phosphoric acid can be completely reacted and that the resulting metal-phospho-silica composition will have application in nearly every type of latex emulsion, including styrene/butadiene, acrylic and polyvinyl acetate, as well as in resin and oil emulsions, liquid resins and resin solutions.

The final pH of the metal-phospho-silica composition is generally on the acid side. When conventional techniques for forming the metal-phospho-silica composition are used, the product will have a pH between about 3 and 3.5. However, when a base is added to the metal hydrogen phosphate solution, prior to reaction with the alkali metal silicate, the final pH will be about 6.0 to 7.1. Therefore, the final product may have a pH anywhere from about 3 to 7.1. Compositions of the former character are particularly useful in paint compositions for use in ferrous metals whereas those of the latter type are best suited for use in adhesives, sealers, caulking materials, etc. Suitable materials to be utilized for this purpose include the alkali metal and ammonium hydroxides. It should also be noted at this point that the addition of the base also results in the evaporation of additional amounts of water during the reaction and produces a metal-phospho-silica composition having no more than about 15 to 20% of free water, and also that smaller volumes of silicate are necessary.

The metal-phopho-silica composition is ultimately prepared by reacting the previously-mentioned metal hydrogen phosphate solution with a liquid alkali metal silicate. The alkali metal silicate may be added without dispersing the same in water to thereby produce a final product having a minimal amount of free water. However, if the silicate is dispersed in water, the amount of water should be less than the weight of the silicate used. The relative proportions of alkali metal silicate and phosphate solution may be varied over a rather wide range, but, in any event, there should be sufficient amounts of these reactants to form a gel-type precipitate. However, it has been found in accordance with the present invention that the amount of silicate should be equal to or less than the hydrogen phosphate solution on a weight basis. It has also been found in accordance with the present invention that the amount of silicate necessary can be reduced to some extent by the addition of the base to the metal hydrogen phosphate solution as previously indicated.

Typical compositions in accordance with the present invention include the following amounts, about 10 to 700 grams, and preferably about 40 to 200 grams of metal component and about 350 to 450 grams of phosphoric acid to produce a hydrogen phosphate solution having from about 450 to 600 grams of active ingredients (less free water). In the formation of the final metal-phospho-silica composition, about 150 to 400 grams of alkali metal silicate will be used and from about 150 to 500 grams of water in both the preparation of the metal hydrogen phosphate solution and the preparation of the metal-phospho-silica composition. In one modification of the present invention, a polyhydric alcohol is added to the liquid alkali metal silicate in order to reduce graining in paint products and the like produced when using the metal-phospho-silica compositions as an additive. Suitable alcohols include glycerin, ethylene glycol, diethylene glycol, hexethylene glycol, propylene glycol, triethylene glycol, trimethylolpropane, trimethylolethane, etc.

The metal-phospho-silica composition may be reduced to a dry powder form by any appropriate means for removing free water therefrom. For example, the product may be washed with water, centrifuged and then dried at a temperature above about 220° F., or the product may be calcined at temperatures above about 300° F.

As indicated, the metal-phospho-silica composition of the present invention is substantially insoluble in water and in most organic solvents. Hence, in order to utilize the same in paint compositions and the like, it is necessary to disperse the composition in an appropriate solvent or combination of solvents. This can be readily accomplished by known means. Likewise, the composition can be readily dispersed in emulsion-type paints and the like. More specifically, in order to form a liquid dispersion, an appropriate surface active agent or emulsifying agent is added to the metal-phospho-silica composition. The preferred surface active agents, for dispersing the metal-phospho-silica composition in organic solvents, are cationic and non-ionic surface active agents and, in most cases, best results are obtained when combinations of cationic and non-ionic surface active agents are utilized. More specifically, suitable cationic surface active agents include primary, secondary, tertiary and quaternary ammonium compounds, such as mixtures of amines containing not less than 80% primary amines having not less than about 10 carbon atoms and molecular weights above about 200, benzethonium chloride, cetalkonium chloride, octadecyldimethylbenzyl ammonium chloride, mexamethonium chloride, alkyl trimethyl ammonium chlorides, lauryl pyridinium chloride, etc. Similarly alkyl propylene diamine dioleates or other aliphatic amines derived from fatty acids may also be utilized. Materials which have been found quite suitable are the "Armeens" by Armour Industrial Chemical Co., having the following general formula: $CH_3(CH_2)_{11}NH_2$, 90 to 98% primary amines and molecular weights of 203 to 291; the "Alamides" by General Mills Co., having the following general formula: $CH_3(CH_2)_{17}NH_2$, 90 to 98% primary amines and molecular weights of 203 to 291; and "Amine D" by Hercules Powder Co., a technical grade of dehydroabiethylamine with 91% primary amine and a molecular weight of 287; "Delamin" by Hercules Powder Co., a tall oil amine comprising straight chain, eighteen carbon atom derivatives high in oleylamine and stearylamine with 85% primary amine and a molecular weight of 266; and "Amine O," "C" and "S" by Geigy Chemical Co., high molecular weight imidazolines of the formula: $CH_3(CH_2)nC_3H_4N_2C_2H_4OH$. Non-ionic surface active agents suitable for use in accordance with the present invention may be exemplified by materials having oxygenated side chains, such as ethylene oxide condensates and ethylene glycol esters, polyoxyethylene plus a fatty acid, alcohol, amide, or amine component, etc. Specific examples include diethyleneglycol monostearate, polyethylene tert.-dodecyl-thioether and related compounds, etc. Suitable cationic and non-ionic surface active agents other than those mentioned are well known to those skilled in the art and are defined in any standard dictionary, such as the condensed Chemical Dictionary, 6th edition, Reinhold, 1956.

The surface active agent should be utilized in amounts anywhere from about 30 to 90 grams of surfactant per 200 to 450 grams of organic solvent.

Suitable organic solvents for use in accordance with the present invention include any of the well-known organic solvent materials alone or in combination. For example, aliphatic hydrocarbons, armoatic hydrocarbons, higher alcohols and polyhydric alcohols may be utilized as solvents. Specific examples include mineral spirits, butyl alcohol, isopropyl alcohol, exylene, toluene, ethylene glycols, propylene glycol, etc. and mixtures of these materials.

The method of preparing compositions of the present invention is relatively simple and the same general sequence of steps was followed in all of the preparations exemplified hereinafter. Specifically, a metal component or components is dispersed in water in a predetermined amount. If more than one metal component is utilized, they may be added to the water in sequence or preferably they may be premixed and then dispersed in water. Where a base is utilized to make the water alkaline, this base is added prior to the dispersion of the metal component in the water. The phosphoric acid is then added to the metal component-water dispersion. At this point, an exothermic reaction takes place with the temperature generally reaching about 190° F. The liquid alkali metal silicate is then added to the metal hydrogen phosphate solution. As previously indicated, the liquid alkali metal silicate may be added as such or it may be dispersed in water and then mixed into the metal hydrogen phosphate solution. In the preferred technique, the metal hydrogen phosphate solution is cooled to a temperature of about 90° F. prior to mixing the alkali metal silicate into the solution. In another variation, as indicated previously, the pH of the metal hydrogen phosphate solution may be adjusted by adding a base to the hydrogen phosphate solution. The addition of this base preferably occurs after having reduced the temperature of the metal hydrogen phosphate solution to about 100° F. The addition of the base will normally increase the temperature of the metal hydrogen phosphate solution to about 210° F. Accordingly, it is again preferred that this temperature be reduced to about 90° F. before adding the liquid alkali metal silicate. When the liquid alkali metal silicate is despersed in water, further improvement may be effected by adding a polyhydric alcohol to the water prior to mixing the liquid alkali metal silicate therewith. The resultant metal-phospho-silica composition may be reduced to a powdered form or prepared as a dispersion in an organic solvent. When the powdered form is desired, the product is either calcined at a temperature above about 300° F. or the product is washed with water, centrifuged and then dried at a temperature above about 220° F. Where a dispersion is desired, an appropriate surface active agent is dispersed in the solvent and this mixture is then added to the metal-phospho-silica composition.

The following Table I lists specific examples of several preparations of hydrogen phosphate solutions, in accordance with the present invention and the acid characteristics thereof.

TABLE I

| Run No. | Metal components, grams | Water, grams | Phosphoric acid Grams | Phosphoric acid Per- cent | Free phos- phoric acid [1] | Total acid [2] |
|---|---|---|---|---|---|---|
| 1 | Magnesium oxide, 100 | 200 | 400 | 75 | 3.13 | 352 |
| 2 | Zinc oxide, 100 | 300 | 400 | 75 | 9.15 | 319 |
| 3 | Zinc oxide, 100 / Barium oxide, 20 / Antimony trioxide, 10 | 200 | 400 | 75 | 10.8 | 168 |
| 4 | Zinc oxide, 75 / Barium oxide, 20 / Antimony trioxide, 10 | 250 | 400 | 75 | 10.8 | 354 |

[1] In hydrogen phosphate solution.
[2] Number of hydrogen phosphate solution.

The specific examples set forth in Table II, below, illustrate metal-phospho-silica compositions of the present invention derived from metal salts.

TABLE II

| Run No. | Metal components, grams | Water with metal, grams | Phosphoric acid grams | Phosphoric acid Per- cent | Sodium sili- cate, grams | Water with sili- cate, grams | Surface active agents, grams | Solvents, grams | pH metal-phosphosilica |
|---|---|---|---|---|---|---|---|---|---|
| 1 | Zinc carbonate, 90 / Manganese carbonate, 10 / Titanium-potassium oxalate, 12 | 300 | 400 | 75 | 300 | 0 | "Amine D," 60 | Isopropyl alcohol, 80 / Mineral spirits, 120 / Ethylene glycol, 20 / Butyl alcohol, 40 | 2.4 |
| 2 | Magnesium carbonate, 20 / Barium carbonate, 20 / Ferrous oxalate, 12 / Zinc carbonate, 36 | [1] 300 | 400 | 75 | 240 | 150 | "Delamin," 36 | Mineral spirits, 260 | 6.1 (added NaOH, 112 grams) |
| 3 | Zinc carbonate, 100 | 300 | 400 | 75 | 360 | 150 | "Armeen D," 40 | Mineral spirits, 180 / Isopropyl alcohol, 60 / Butyl alcohol, 20 / Triethylene glycol, 10 | 2.9 |
| 4 | Barium carbonate, 30 / Manganese carbonate, 12 / Lithium carbonate, 10 / Zinc carbonate, 48 | 250 | 360 | 85 | 240 | 120 | "Armeen D," 48 | Mineral spirits, 300 | 6.3 (added NaOH, 21 grams) |
| 5 | Copper carbonate, 20 / Ferrous oxalate, 12 / Zinc carbonate, 64 | 200 | 360 | 85 | 200 | 150 | "Amine O," 36 | Isopropyl alcohol 120 / Propylene glycol, 20 / Mineral spirits, 160 | 5.9 (added NaOH, 96 grams) |
| 6 | Zinc carbonate, 40 / Titanium-potassium oxalate, 20 / Barium carbonate, 30 | 250 | 360 | 85 | 260 | | | | |
| 7 | Zinc carbonate, 120 | 300 | 400 | 75 | 240 | 150 | | | (Added NaOH, 96 grams) |
| 8 | Zinc carbonate, 120 | 300 | 400 | 75 | 240 | 150 | "Armeen D," 60 | Xylene, 120 / Mineral spirits, 100 / Butyl alcohol, 60 / Triethylene alcohol, 20 | |
| 9 | Zinc carbonate, 120 | 300 | 400 | 75 | 240 | 150 | "Armeen C," 48 / "Armeed D," 12 | Mineral spirits, 220 / Toluene, 80 | |
| 10 | Zinc carbonate, 120 | 300 | 400 | 75 | 240 | 150 | "Amine D," 80 | Mineral spirits, 140 / Butyl alcohol, 60 / Isopropyl alcohol, 40 / Diethylene glycol, 60 | |
| 11 | Zinc carbonate, 60 / Barium carbonate, 20 / Magnesium carbonate, 12 / Copper carbonate, 12 | 300 | 360 | 85 | 240 | 150 | "Amine D," 42 | Mineral spirits, 120 / Isopropyl alcohol, 80 / Butyl alcohol, 20 / Propylene glycol, 20 | (Added KOH-96 grams) |

[1] Alkalized.

In Example 2, above, the water was made alkaline with an alkali hydroxide prior to dispersing the metal components therein. In examples 2, 4, 5 and 7, above, the NaOH was added to the metal hydrogen phosphate solutions prior to the addition of sodium silicate. Likewise, in Example 11, the KOH was added prior to silicate addition.

The following Table III illustrates compositions prepared from metal oxides.

In Table IV, the bases listed in the pH column were added to the metal hydrogen phosphate solution prior to the addition of the silicate. When such bases are used, the free acid content of the metal-phospho-silica composition may be as low as 8.84% by weight.

As indicated previously, the metal-phospho-silica composition of the present invention is a soft, non-crystalline, gel-type precipitate which is substantially insoluble in water and in most organic solvents. However, the exact

TABLE III

| Run No. | Metal components, grams | Water with metal, grams | Phosphoric acid grams | Phosphoric acid Percent | Sodium silicate, grams | Water with silicate, grams | Surface active agents, grams | Solvents, grams | pH metal-phosphosilica |
|---|---|---|---|---|---|---|---|---|---|
| 1 | Zinc oxide, 80; Antimony trioxide, 40 | 300 | 400 | 75 | 350 | | Cationic amine, 60 | Isopropyl alcohol, 80; Mineral spirits, 320 | 3.1 |
| 2 | Zinc oxide, 80; Antimony trioxide, 40 | 300 | 400 | 75 | 200 | | Cationic amine, 60 | Isopropyl alcohol, 80; Mineral spirits, 320 | 5.9 (added 11 grams NaOH) |
| 3 | Zinc oxide, 80; Antimony trioxide, 40 | 300 | 400 | 75 | 280 | 150 | Cationic amine, 80 | Mineral spirits, 240; Isopropyl alcohol, 60; Xylene, 60; Diethylene glycol, 40 | |
| 4 | Zinc oxide, 90; Boron oxide, 20; Antimony trioxide, 10 | 400 | 400 | 75 | 240 | 100 | "Amine D," 60 | Mineral spirits, 210; Isopropyl alcohol, 60; Xylene, 30 | 2.3 |
| 5 | Zinc oxide, 120; Antimony trioxide, 20 | 300 | 360 | 85 | 280 | | "Amine D" | Xylene, 260; Isopropyl alcohol, 80; Diethylene glycol, 10 | 2.4 |
| 6 | Zinc oxide, 85; Magnesium oxide, 20 | 300 | 400 | 75 | 200 | 100 | "Delamin," 48 | Mineral spirits, 300 | (Added 112 grams KOH) |
| 7 | Magnesium oxide, 40; Antimony trioxide, 20; Zinc oxide, 80 | 300 | 400 | 75 | 240 | | Cationic amine, 60 | Mineral spirits, 360 | 2.1 |
| 8 | Zinc oxide, 125 | 400 | 400 | 75 | 240 | 150 | Cationic amine, 48 | Mineral spirits, 200; Isopropyl alcohol, 80; Xylene, 60 | 6.1 (added 96 grams NaOH) |
| 9 | Barium oxide, 15; Boron oxide, 20; Zinc oxide, 72 | 200 | 360 | 85 | 200 | 100 | Cationic amine, 72 | Xylene, 260; Diethylene glycol, 40; Mineral spirits, 60 | 5.7 (added 64 grams KOH) |
| 10 | Zinc oxide, 60; Boron oxide, 16; Magnesium oxide, 20 | 300 | 360 | 85 | 260 | | | | 7.1 (added 128 grams NH₂OH) |
| 11 | Zinc oxide, 100; Magnesium oxide, 20; Antimony trioxide, 24 | 200 | 360 | 85 | 250 | 50 | "Amine D," 16 | Mineral spirits, 100 | |

In Table III, above, the hydroxides listed were added to the metal hydrogen phosphate solutions just prior to the addition of the silicate.

The following Table IV illustrates compositions prepared from mixtures of metal salts and metal oxides.

nature of the composition is not known. From all available information, it appears that the metal-phospho-silica composition is primarily a complex of the metal hydrogen phosphate solution and the silicate rather than a true reaction product, although it also appears that at least a part

TABLE IV

| Run No. | Metal components, grams | Water with metal, grams | Phosphoric acid grams | Phosphoric acid Percent | Sodium silicate, grams | Water with silicate, grams | Surface active agents, grams | Solvents, grams | pH metal-phosphosilica |
|---|---|---|---|---|---|---|---|---|---|
| 1 | Arsenous trioxide, 25; Magnesium carbonate, 20; Calcium fluoride, 8; Zinc nitrate, 10; Barium nitrate, 12 | ¹ 250 | 400 | 75 | 240 | ³ 150 | "Armeen S," 20 | Mineral spirits, 180; Isopropyl alcohol, 100; Ethylene glycol, 20 | 4.8 (added 64 grams NaOH) |
| 2 | Zinc oxide, 40; Zinc carbonate, 24; Magnesium oxide, 12; Titanium-potassium oxide, 10; Aluminum-sodium fluoride, 8.0 | 300 | 360 | 85 | 300 | 150 | "Amine O," 18; "Armeen T," 20 | Mineral spirits, 250 | 2.8 |
| 3 | Zinc oxide, 48; Barium oxalate, 16; Manganese carbonate, 12; Calcium fluoride, 16 | ² 250 | 360 | 85 | 240 | | "Amine O," 12; "Alamide 11," 12 | Mineral sprits, 200; Toluol, 80; Butyl alcohol, 20 | 3.09 (added 48 grams NaOH) |
| 4 | Aluminum hydrate, 40; Calcium carbonate, 18; Zinc oxide, 100; Boron oxide, 12; Magnesium fluoride, 12 | ⁴ 300 | 400 | 75 | 240 | ⁵ 150 | "Delamin," 20; "Armeen C," 24 | Mineral spirits, 180; Isopropyl alcohol, 100; Triethylene glycol, 20 | 4.09 (added 64 grams KOH) |
| 5 | Zinc oxide, 52; Lead carbonate, 6.0; Antimony trioxide, 6; Barium nitrate, 6.0; Barium oxalate, 10 | 250 | 360 | 85 | 360 | 150 | "Amine D," 18; "Armeen C," 20 | Mineral spirits, 160; Isopropyl alcohol, 40 | 3.02 |

¹ Plus NaOH, 16 grams.
² Plus NaOH, 15 grams.
³ Plus triethylene glycol, 20 grams.
⁴ Plus NaOH, 12 grams.
⁵ Plus diethylene glycol, 12 grams.

I claim:

1. A method of preparing a metal-phospho-silica composition, comprising, reacting a metal hydrogen phosphate solution, containing a major proportion of a metal dihydrogen phosphate, wherein the metal is a metal selected from the group consisting of divalent metals, trivalent metals and mixtures thereof and a minor proportion of free orthophosphoric acid, with a liquid alkali metal silicate, the ratio of said phosphate solution to said silicate being sufficient to produce a gel-type precipitate.

2. A method in accordance with claim 1 wherein the metal is a divalent metal.

3. A method in accordance with claim 1 wherein the metal is a trivalent metal.

4. A method in accordance with claim 1 wherein the amount of free orthophosphoric acid is less than about 15 by weight.

5. A method in accordance with claim 1 wherein the metal hydrogen phosphate solution also contains a sufficient amount of a base to raise the pH of the reaction product.

6. A method in accordance with claim 5 wherein the pH of the reaction product is below about 7.

7. A method in accordance with claim 1 wherein the weight ratio of metal hydrogen phosphate solution, exclusive of free water, to silicate is at least 1 to 1.

8. A method in accordance with claim 1 wherein the metal hydrogen phosphate solution is an aqueous solution.

9. A method in accordance with claim 8 wherein the amount by weight of water is less than the amount by weight of phosphorous-containing components in the metal hydrogen phosphate solution.

10. A method in accordance with claim 1 wherein the silicate is dispersed in water.

11. A method in accordance with claim 10 wherein the amount of water is less than the weight of the phosphorous-containing components of the metal hydrogen phosphate solution.

12. A method in accordance with claim 1 wherein the metal hydrogen phosphate solution is an aqueous solution, the silicate is dispersed in water and the total amount by weight of water is less than the amount by weight of the phosphorous-containing components of said metal hydrogen phosphate solution.

13. A method in accordance with claim 1 wherein the alkali metal silicate is sodium silicate.

14. A method in accordance with claim 1 wherein the silicate has a low molecular weight polyhydric alcohol added thereto.

15. A method in accordance with claim 1 wherein the reaction product is dispersed in at least one solvent, selected from the group consisting of hydrocarbon solvents and low molecular weight polyhydric alcohols, with a surface active agent.

16. A method in accordance with claim 15 wherein the surface active agent is a cationic surface active agent.

17. A method in accordance with claim 15 wherein the surface active agent is a non-ionic surface active agent.

18. A method in accordance with claim 15 wherein the surface active agent is a mixture of cationic and non-ionic surface active agent.

19. A method in accordance with claim 1 wherein substantially all of the free water is removed from the reaction product to form a powder thereof.

20. A metal-phospho-silica composition prepared by reacting a metal hydrogen phosphate solution, containing a major proportion of a metal dihydrogen phosphate, wherein the metal is a metal selected from the group consisting of divalent metals, trivalent metals and mixtures thereof and a minor proportion of free orthoprosphoric acid, with a liquid alkali metal silicate, the ratio of said phosphate solution to said silicate being sufficient to produce a gel-type precipitate.

21. A composition in accordance with claim 20 wherein the metal is a divalent metal.

22. A composition in accordance with claim 20 wherein the metal is a trivalent metal.

23. A composition in accordance with claim 20 wherein the amount of free orthophosphoric acid is less than about 15% by weight.

24. A composition in accordance with claim 20 wherein the metal hydrogen phosphate solution also contains a sufficient amount of a base to raise the pH of the reaction product.

25. A composition in accordance with claim 24 wherein the pH of the reaction product is below about 7.

26. A composition in accordance with claim 20 wherein the weight ratio of metal hydrogen phosphate solution, exclusive of free water, to silicate is at least 1 to 1.

27. A composition in accordance with claim 20 wherein the metal hydrogen phosphate solution is an aqueous solution.

28. A composition in accordance with claim 27 wherein the amount by weight of water is less than the amount by weight of phosphorous-containing components in the metal hydrogen phosphate solution.

29. A composition in accordance with claim 20 wherein the silicate is dispersed in water.

30. A composition in accordance with claim 29 wherein the amount of water is less than the weight of the phosphorous-containing components of the metal hydrogen phosphate solution.

31. A composition in accordance with claim 20 wherein the metal hydrogen phosphate solution is an aqueous solution, the silicate is dispersed in water and the total amount by weight of water is less than the amount by weight of the phosphorous-containing components of said metal hydrogen phosphate solution.

32. A composition in accordance with claim 20 wherein the alkali metal silicate is sodium silicate.

33. A composition in accordance with claim 20 wherein the silicate has a low molecular weight polyhydric alcohol added thereto.

34. A composition in accordance with claim 20 wherein the reaction product is dispersed in at least one solvent, selected from the group consisting of hydrocarbon solvents and low molecular weight polyhydric alcohols, with a surface active agent.

35. A composition in accordance with claim 34 wherein the surface active agent is a cationic surface active agent.

36. A composition in accordance with claim 34 wherein the surface active agent is a non-ionic surface active agent.

37. A composition in accordance with claim 34 wherein the surface active agent is a mixture of cationic and non-ionic surface active agents.

38. A composition in accordance with claim 20 wherein substantially all of the free water is removed from the reaction product to form a powder thereof.

References Cited

UNITED STATES PATENTS

| | | | |
|---|---|---|---|
| 2,594,725 | 4/1952 | Britt | 252—317 X |
| 2,658,869 | 11/1953 | Stross et al. | 252—317 X |
| 3,004,921 | 10/1961 | Stossel | 252—309 |

RICHARD D. LOVERING, Primary Examiner

U.S. Cl. X.R.

106—14, 228 B, 292, 297, 301, 303, 304, 306; 252—317, 387, 389; 260—41 R, 41.5 R